United States Patent [19]
Knox et al.

[11] Patent Number: 5,093,463
[45] Date of Patent: Mar. 3, 1992

[54] MALEINIZED ROSIN CONTAINING SOLVENT-BORNE ALKYD RESIN COMPOSITIONS

[75] Inventors: David E. Knox, Goose Creek; Timothy B. Cameron, Hanahan, both of S.C.

[73] Assignee: Westvaco Corporation, New York, N.Y.

[21] Appl. No.: 640,852

[22] Filed: Jan. 14, 1991

[51] Int. Cl.$^5$ ............................................. C08G 63/48
[52] U.S. Cl. .................................. 528/272; 528/295.3; 528/295.5; 528/296; 528/298; 528/302; 528/303; 528/307; 528/308; 528/308.6; 428/480
[58] Field of Search .................. 528/272, 295.3, 295.5, 528/296, 302, 303, 307, 308, 308.6, 298; 428/480

[56] References Cited

U.S. PATENT DOCUMENTS

| | | | |
|---|---|---|---|
| Re. 30,660 | 6/1981 | Laganis | 524/598 |
| 3,935,158 | 1/1976 | Watanabe | 523/172 |
| 4,375,528 | 3/1983 | Lange | 524/538 |
| 4,622,357 | 11/1986 | Tsuchida et al. | 524/270 |
| 4,927,669 | 5/1990 | Knox et al. | 427/239 |

OTHER PUBLICATIONS

"Advanced Organic Chemistry, Reaction, Mechanism and Structure", Mar., (2nd ed. 1977), p. 726, and pp. 761-766.

"Alkyd Resin Technology", T. C, Patton, (Interscience Publishers, 1962), pp. 70-1.

"An Overview of the Basic Rheological Behavior of Polymer Fluids with an Emphasis on Polymer Moles", G. L. Wilkes, *Journal of Chemical Education*, vol. 58, Nov. 1981, pp. 880-892.

"Binders For Higher-Solids Coatings Parts 1: Synthesis of Model Alkyd Resins" S. L. Kangas and F. N. Jones, *Journal of Coatings Technology*, vol. 59, No. 744, Jan. 1987, pp. 89-97.

*Tall Oil and Its Uses*-II, E. C. McSweeney, H. G. Arm, and J. Russell, (Pulp Chemical Assoc., Inc., 1987) pp. 26-27.

Amoco Technical Bulletin GTSR-21, W. T. Riddick, "Resin TG-151, Water Borne Alkyd For Air Dry Coatings".

Amoco Technical Bulletin GTSR-36, R. R. Engelhardt, "Resin BH-138, Water Borne Polyester For Industrial Coatings".

*Primary Examiner*—John Kight, III.
*Assistant Examiner*—Sam A. Acquah
*Attorney, Agent, or Firm*—Daniel B. Reece, IV; Terry B. McDaniel; R. L. Schmalz

[57] ABSTRACT

Solvent-borne alkyd resin compositions are disclosed comprising a high-purity maleinized rosin anhydride. Substitution of the trifunctional acid component of the alkyd resin composition with this rosin anhydride permits a reduction in the viscosity of the resin without adversely affecting the physical properties of the cured film of the resin.

13 Claims, No Drawings

MALEINIZED ROSIN CONTAINING SOLVENT-BORNE ALKYD RESIN COMPOSITIONS

FIELD OF THE INVENTION

The invention relates to a novel composition of matter for reducing the volatile organic compound levels in solvent-borne coatings. Particularly, this invention relates to a novel solvent-borne composition that can be employed to reduce the viscosity in alkyd resin formulations. The invention composition permits the use of reduced amounts of environmentally harmful solvents in coatings based on alkyd resins.

BACKGROUND OF THE INVENTION

One of the first applications of synthetic polymer synthesis in coatings technology was the production of the alkyd resin. It was successful in chemically combining fatty acids or their esters into a polyester structure, thereby enhancing the properties of these coating vehicles.

A typical alkyd resin is a polyester made by reacting an unsaturated fatty acid, a dibasic carboxylic acid, and a polyol. Usually, the dibasic acid is phthalic anhydride or isophthalic acid, and the polyol is a trifunctional alcohol. The reaction of the dibasic carboxylic acid with the polyol produces the backbone of the polyester, thereby building its molecular weight. In turn, the fatty acid groups attach to this backbone and, in the presence of oxygen and a metal catalyst, serve to cure the resin into the final crosslinked film.

It is also known to produce alkyd resins by replacing the described dibasic acids with trifunctional acids, as shown by T. C. Patton, *Alkyd Resin Technology* (Interscience Publishers, 1962), pp. 70-1, which is hereby incorporated by reference. The use of trifunctional acids allows the introduction of additional branching points onto the backbone of the polymer. When these branching points are added a less linear polymer possessing different rheological properties is produced. This change in rheology results in a different viscosity for the branched polymer than for a linear polymer with the same molecular weight. The mechanics of this rheological behaviour are reviewed in "An Overview of the Basic Rheological Behavior of Polymer Fluids with an Emphasis on Polymer Melts", G. L. Wilkes, *Journal of Chemical Education*, Vol. 58, November 1981, pp. 880-892.

Resins are typically classified by the amount of fatty acid that they contain, i.e. their "oil length". The oil length of an alkyd is defined as the weight of any fatty acid present plus the weight of the polyol needed to completely esterify this fatty acid (minus the weight of evolved water from the esterification), expressed as a percentage of the total weight of the finished resin. Oil length (OL) is divided into three classes: short-, medium-, and long-oil. A medium-oil alkyd contains between 45 to 55% oil, with short-oil alkyds containing less and long-oil alkyds containing more oil. Long-oil and medium-oil lengths are commonly used in solvent-based decorative coatings, while short-oil alkyds are found in automotive and general industrial stoving compositions.

Traditionally, solvent-based alkyds have obtained their good film properties by a combination of high resin molecular weight coupled with drying from pendant, unsaturated fatty acids present in the alkyd. While contributing to desirable film properties, the high molecular weight of the resin also causes the resin to have an unsuitably high viscosity, thereby necessitating low-solids formulations for coating applications. Due to environmental concerns and increasing governmental regulations on the volatile organic content (VOC) of coatings, coating producers are attempting to find alternatives to these conventional low-solids level, solvent-based formulations.

One approach to address the VOC regulations is the development of water-based formulations. While the use of water as a solvent is attractive, it has proven difficult to obtain the properties and performance of a solvent-based coating via a water-based system. These problems are especially pronounced in the areas of high gloss and corrosion resistance.

The other popular approach to the VOC regulations has been to reduce the amount of volatile organic solvent necessary for a formulation by reducing the viscosity of the alkyd resin. This so-called high-solids approach involves developing resins that are soluble in organic solvents at levels as high as 60 to 100 weight percent solids. These high-solids levels must be attained while maintaining a low viscosity to allow for formulation and application of the coating.

An example of a high-solids approach is taught in the commonly assigned U.S. patent application Ser. No. 07/621,752 filed by David E. Knox on Dec. 12, 1990, which is hereby incorporated by reference. That application teaches the use of a 22-carbon aliphatic branched-chain anhydride in solvent-based alkyds to reduce the viscosity of the resin.

Therefore, it is the object of this invention to have an alkyd resin composition that addresses environmental concerns by significantly reducing the viscosity of the resin, thereby reducing the amount of solvent necessary for the coating formulation. In addition, organic solvents are frequently expensive and any means of reducing their presence could lead to lower costs for coatings.

SUMMARY OF THE INVENTION

The object of the invention is met by the use of a high-purity maleinized rosin anhydride in the solvent-based alkyd in lieu of either phthalic anhydride or trimellitic anhydride. This maleinized rosin anhydride, when polymerized into the backbone of a alkyd resin, significantly reduces the viscosity of the resin compared to similar, unmodified resins. Thus, the substitution allow systems to be formulated with a smaller amount of solvents than their aromatic counterparts.

DESCRIPTION OF THE PREFERRED EMBODIMENTS

It is well known in the art to react an unsaturated fatty acid, a dibasic carboxylic acid, and a polyol to produce an alkyd resin, as shown in "Binders for Higher-Solids Coatings Part 1: Synthesis of Model Alkyd Resins," S. L. Kangas and F. N. Jones, *Journal of Coatings Technology*, Vol. 59, No. 744, January 1987, pp. 89-97, which is hereby incorporated by reference. Partial substitution of trifunctional acids for the above described dibasic acids is also known. Examples of the use of trifunctional acids in alkyd and polyester compositions are given in *Amoco Technical Bulletins* GSTR - 21 and GSTR - 36, which are hereby incorporated by reference.

Unsaturated fatty acids which are suitable for use in the reaction include, but are not limited to, the following:
tall oil
soybean oil
tung oil
linseed oil
linoleic acid
linolenic acid.

Polyols which are suitable for use in the reaction include, but are not limited to, the following:
1,4-butanediol
ethylene glycol
propylene glycol
neopentyl glycol
glycerol
trimethylolethane
trimethylolpropane
pentaerythritol
hexanediol
isomeric cyclohexane diols.

Dibasic carboxylic acids which are suitable for use in the reaction include, but are not limited to, the following:
phthalic anhydride
orthophthalic acid
terephthalic acid
maleic anhydride
fumaric acid
azelaic acid
C-36 dimer acid.

Trifunctional acids which are suitable for use in the reaction include, but are not limited to, the following:
trimellitic anhydride
isomeric benzene tricarboxylic acids
isomeric napthalene tricarboxylic acid
citric acid.

These lists are intended to be representative and it will be obvious to those skilled in the art that a variety of other acids and polyols can be used. Therefore, other acids and polyols suitable for use in the reaction can be considered part of this invention when used with the described composition of matter below.

Most alkyd resin formulations utilizing triacids are based on trimellitic anhydride due to its commercial availability. While other aromatic or aliphatic triacids could be used they are not as reactive as trimellitic anhydride and can give gelation in the alkyd since they have similar reactivity in their carboxylic acid groups. For the purpose of describing this invention, trimellitic anhydride is considered as the comparative prior art trifunctional material since it is the most readily available commercial product (Amoco Chemicals) and also has the desired reactivity in the anhydride linkages.

It has been discovered that use of high-purity maleinized rosin anhydride serves a similar function as trimellitic anhydride in regards to reacting with an alkyd system. Significantly, these materials, when used according to the descriptions of this invention, can substantially reduce the viscosity of resins in solvent media when substituted for aromatic moieties at the same solids level. An alternative embodiment is to formulate the resins to similar viscosities. The resins incorporating the high-purity maleinized rosin anhydride require less solvent.

The process for the production of the novel solvent-borne alkyd resin comprises reacting: 20 to 70% by weight of an unsaturated fatty acid; 10 to 50% by weight of a polyol; 10 to 50% by weight of a dibasic carboxylic acid; up to 20% by weight of a trifunctional acid; and 0.2 to 20% by weight of a high-purity maleinized rosin anhydride. This high-purity maleinized rosin anhydride (hereafter referred to as RA) is prepared by the following technique. A suitable grade of rosin (e.g. Rosin S, manufactured by Westvaco Corporation) is reacted with maleic anhydride by heating these two components in the presence of iodine to a temperature between 180° and 260° C. for a period of about 10 minutes. The crude maleinized rosin is stripped of unreacted components via wiped-film distillation, thereby yielding an 85% maleinized rosin product. This partially-purified rosin is dissolved in a minimum of ether, to which heptane is gradually added to make the solution cloudy. The solution is allowed to stand for 18 hours before the resulting powder is collected.

The powder produced by the above recrystallization method has been found by gas chromatography to be greater than 98% pure maleinized rosin having an acid number of 421 (versus a theoretical acid number of 420). Thus, it is of a sufficient quality to be utilized in the production of polymers. A representative structure for rosin anhydride derived from levopimaric acid is shown below:

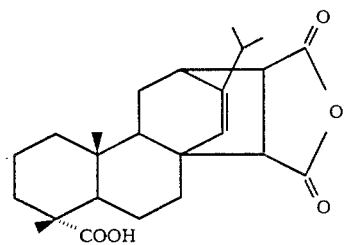

As shown by E. E. McSweeney, H. G. Arit, and J. Russell in *Tall Oil and Its Uses—II* (Pulp Chemicals Association, Inc., 1987), pp. 26-27 (which is hereby incorporated by reference), it is well known in the art that a variety of isomers may arise from both Diels-Alder and/or ene adductions onto rosin type acids. Therefore, the above structure is representative of only one of the possible maleinized rosin acid isomers.

The invention composition is useful in reducing the viscosity of long-oil, medium-oil, and short-oil alkyd resins. As appreciated in the art, the exact components and properties of components desired for any coating application can vary; and, therefore, routine experimentation may be required to determine the optimal components and proportions of components necessary to achieve the desired properties for a given application.

The following examples are provided to illustrate further the present invention and are not to be construed as limiting the invention in any manner.

EXAMPLES

A standard medium-oil alkyl resin, made from PAMOLYN® 200 (a tall-oil derived, unsaturated fatty acid containing 78% linoleic acid, made by Jercules), phthalic anhydride (PA), and trimethylol propane (TMP) was produced based on a formulation given in the above referenced article by S. L, Kangas and F. N. Jones (Alkyd No. T-7-C on p. 91). A series of modified resins were created by substituting, on an equivalents basis, various trifunctional acids for a given percentage of the PA used in the standard resin.

All alkyds were prepared by a conventional solvent procedure, as illustrated by the following preparation of the 10% RA modified resin. PAMOLYN ® 200 (67.5 g, 0.24 mol), PA (38.6 g, 0.26 mol), RA (7.7 g, 0.19 mol), TMP (39.9 g, 0.30 mol) and xylene (20.0 g) were charged into a 250-ml three neck round-bottom flask equipped with a Dean-Stark trap and cold water condenser, a heating mantle, a theremometer, a nitrogen inlet and a mechanical stirrer. Lithium ricinoleate, at 0.1% based on the fatty acid present, was used as a catalyst for all the resin preparations. The mixture was heated to 175° C., under nitrogen, and the temperature was increased 10° C. every 30 minutes until a top temperature of 240° C. was reached. This temperature was maintained until an acid number of approximately eleven was attained. The resins were cooled, poured into glass jars and stored under nitrogen.

TABLE I

| | RESIN FORMULATIONS | | | |
|---|---|---|---|---|
| Resin | Weight % Of Charge | | | |
| Description | Pamolyn 200 ® | PA | TMP | Triacid |
| Std. TMP | 45.0 | 28.5 | 26.5 | 0.00 |
| 10% TMA | 45.1 | 25.8 | 26.7 | 2.47 |
| 10% CA | 45.1 | 25.8 | 26.7 | 2.47 |
| 07% RA | 44.7 | 25.5 | 26.4 | 3.40 |
| 10% RA | 43.9 | 25.1 | 26.0 | 5.06 |

CA Citric Acid (Triacid)
TMA Trimellitic Anhydride (triacid)
PA Phthalic Anhydride
TMP Trimethylol Propane
Pamolyn 200 ® A tall-oil derived, unsaturated fatty acid containing 78% linoleic acid, made by Hercules.
RA A high-purity (recrystallized) maleinized rosin anhydride, made by Westvaco.

TABLE II

| | RESIN CONSTANTS | | | | |
|---|---|---|---|---|---|
| Resin | Constants | | | Rxn Time | Final |
| Description | K | Fav | OL | R | (hrs) | Acid No. |
| Std. TMP | 1.006 | 2.07 | 53 | 1.083 | 8.0 | 12 |
| 10% TMA | 0.999 | 2.09 | 53 | 1.091 | 7.5 | 11 |
| 10% CA | 0.999 | 2.09 | 55 | 1.088 | 11.0 | 10 |
| 07% RA | 1.015 | 2.09 | 54 | 1.120 | 16.0 | 10 |
| 10% RA | 0.998 | 2.10 | 53 | 1.093 | 14.0 | 11 |

The standard and modified resin formulations are given in Table I. Table II contains a series of parameters which can be used to help predict the final properties of the alkyd resins. These parameters were kept as constant as possible in each of the formulations so that the resins being compared would be as similar as possible. K is the alkyd constant, equal to the total moles of starting material divided by the total equivalents of acid present. To obtain a satisfactory resin this value should be $0.1 \pm 0.15$. $F_{av}$ is the average functionality of the alkyd and is equal to the total equivalents of starting material divided by the total moles of starting material. OL is the oil length of the resin as explained earlier in the application. R is the ratio of total OH groups from the polyol to total acid groups present in the starting material. The last two columns are the length of time (in hours) for the reaction and the final acid number of the resin, respectively.

The reaction times (Table II, Column 6) necessary to obtain the desired acid numbers were longer with RA than with the other materials. This is probably due to steric hinderance to ester formation at the quaternary carboxylic acid group in the RA system.

Once prepared, the resins were reduced to 50% solids in mineral spirits so that films could be made and evaluated. The resin viscosity versus solids content, in mineral spirits and xylene, was also tested (see Table IV below). A combination of three metal driers (calcium, cobalt, and zirconium) was added to the diluted resins. The driers were added at levels of 0.05% Ca, 0.05% Co, and 0.3% Zr (based on the resin solids weights) to the 50% solids resins and allowed to sit overnight before the films were drawn down. No other additives were used. Films were cast on both steel and aluminum panels using a draw down bar at a wet film thickness of 2 mls. Except for the 24 hour hardness determinations, the films were dried for one week at ambient conditions before any evaluations were performed.

The alkyd resin film evaluations are shown in Table III below. Dry times were reported for a 300 g Zapon test. Hardness was determined using the standard pencil test after one day, and again after seven days. Impact resistance, both direct and reverse, was tested with a Gardner Impact Tester on steel panels. The Mandrel Flexibility and the cross-hatch adhesion tests were performed on aluminum panels.

TABLE III

| | ALKYD RESIN PHYSICAL PROPERTIES | | | | | | |
|---|---|---|---|---|---|---|---|
| | DRY TIMES (min) | PENCIL HARDNESS* | | IMPACT** | | | |
| DESCRIPTION | Zapon | 1 Day | 7 Day | Direct | Reverse | FLEX** | ADHES*** |
| Std TMP | 80 | B | B | >160 | 100 | >32% | 100 |
| 10% TMA | 85 | H | 2H | >160 | >160 | >32% | 100 |
| 10% CA | 220 | 2B | HB | >160 | >160 | >32% | 100 |
| 07% RA | 160 | H | H | 150 | 10 | >32% | 100 |
| 10% RA | 200 | F | H | 130 | 10 | >32% | 100 |

*Series in order of increasing hardness: 6B to 1B, HB, F, H to 6H.
**160 lbs/in and 32% are the maximum limits of the impact resistance and Mandrel Flexibility texts, respectively.
***Cross-hatch adhesion test with a maximum of 100 squares.

Overall, the dry times for the aromatic systems were quite good, which is to be expected for a conventional alkyd prepared with a high linoleic acid content fatty acid such as PAMOLYN ® 200. The aliphatic and amorphous structures of the RA and citric acid systems took longer to dry than did the aromatic systems.

The pencil hardness values show that substitution of the trifunctional materials gives harder films than the difunctional phthalic anhydride. Initial (one day) hardnesses are similar, but after seven days the trifunctional materials are several pencil values harder. The exception is the citric acid based system.

While other properties such as adhesion and flexibility were generally equal, the RA systems exhibited a decreased tolerance for impact resistance. To the extent that rosin is used to give "harder" surfaces, this result is not very surprising. When taken together, these results seem to indicate that RA formulated coatings should have applications in niche markets where these coatings could offer specific property advantages over coatings based on either the difunctional phthalic anhydride or the trifunctional trimellitic anhydride.

Two solvents, xylene and mineral spirits, were used to determine the viscosity of the resin as a function of the solids level. All viscosity data were collected at 25° C. using a Brookfield viscometer. Table IV gives the viscosity data for the evaluated resins. Data indicate that at lower substitution levels (07%), when RA is substituted for either phthalic or trimellitic anhydride, relatively large viscosity reductions can be observed. At higher substitution levels (10%) the increase in viscosity from crosslinking overcomes the decreases from having an aliphatic substituent replacing the aromatic phthalic or trimellitic anhydrides.

TABLE IV

VISCOSITY DATA FOR RESINS

| Resin Description | Solvent | Solids Level | | | |
|---|---|---|---|---|---|
| | | 80% | 70% | 60% | 50% |
| Std. TMP | MS | 16,425 | 4,200 | 790 | 155 |
| | Xylene | 3,950 | 325 | 90 | 20 |
| 10% TMA | MS | 16,240 | 4,264 | 976 | 196 |
| | Xylene | 2,444 | 488 | 112 | 36 |
| 10% CA | MS | 21,280 | 6,080 | 1,136 | 256 |
| | Xylene | 3,792 | 628 | 132 | 36 |
| 07% RA | MS | 10,080 | 2,156 | 532 | 128 |
| | Xylene | 1,940 | 360 | 84 | 16 |
| 10% RA | MS | 21,040 | 2,368 | 600 | 140 |
| | Xylene | 2,076 | 328 | 76 | 24 |

These decreases in viscosity were achieved without adversely affecting the physical properties of the systems.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A process for the production of a solvent-borne alkyd resin which comprises reacting:
   (a) 20 to 70% by weight of an unsaturated fatty acid,
   (b) 10 to 50% by weight of a polyol,
   (c) 10 to 50% by weight of a dibasic carboxylic acid,
   (d) up to 20% by weight of a trifunctional acid, and
   (e) 0.2 to 20% by weight of a high-purity maleinized rosin anhydride.

2. The process of claim 1 which comprises reacting:
   (a) 25 to 65% by weight of an unsaturated fatty acid,
   (b) 15 to 40% by weight of a polyol,
   (c) 10 to 35% by weight of a dibasic carboxylic acid,
   (d) up to 10% by weight of a trifunctional acid, and
   (e) 0.2 to 9% by weight of a high-purity maleinized rosin anhydride.

3. The process of claim 1 wherein the unsaturated fatty acid is selected from the group consisting of tall oil fatty acid, soybean oil fatty acid, tung oil fatty acid, linseed oil fatty acid, linoleic acid, and linolenic acid; the polyol is selected from the group consisting of 1,4-butanediol, ethylene glycol, propylene glycol, neopentyl glycol, glycerol, trimethylolethane, trimethylolpropane, pentaerythritol, hexanediol, and cyclohexane diol; the dibasic carboxylic acid is selected from the group consisting of phthalic anhydride, orthophthalic acid, terephthalic acid, maleic anhydride, fumaric acid, azelaic acid, and C-36 dimer acid; and the trifunctional acid is selected from the group consisting of trimellitic anhydride, isomeric benzene tricarboxylic acid, isomeric napthalene tricarboxylic acid, and citric acid.

4. The product of the process of claim 1.

5. The product of the process of claim 2.

6. A solvent-borne alkyd resin composition comprising a fatty acid drying component, a polyol, a dibasic acid component, and a fatty acid-based trifunctional acid component wherein from 2 to 100% of the trifunctional acid component is a high-purity maleinized rosin anhydride.

7. The composition of claim 6 wherein the fatty acid drying component is selected from the group consisting of tall oil fatty acid, soybean oil fatty acid, tung oil fatty acid, linseed oil fatty acid, linoleic acid, and linolenic acid; the polyol is selected from the group consisting of 1,4-butanediol, ethylene glycol, propylene glycol, neopentyl glycol, glycerol, trimethylolethane, trimethylolpropane, pentaerythritol, hexanediol, and cyclohexane diol; the dibasic carboxylic acid component is comprised of the group consisting of phthalic anhydride, orthophthalic acid, terephthalic acid, maleic anhydride, fumaric acid, azelaic acid; and the trifunctional acid component is further comprised of the group consisting of trimellitic anhydride, isomeric benzene tricarboxylic acid, isomeric napthalene tricarboxylic acid, citric acid, and said maleinized rosin anhydride.

8. The composition of claim 6 exhibiting solids levels up to 100%, based on initial reduction of the fatty acid drying component, the polyol, the dicarboxylic acid component, and the trifunctional acid component.

9. A coating comprising the alkyd resin of claim 1 dissolved in a non-aqueous solvent.

10. The coating of claim 9 further comprising pigment dispersed therein.

11. A coating comprising the composition of claim 6 wherein said alkyd resin composition is a long-oil alkyd resin composition.

12. A coating comprising the composition of claim 6 wherein said alkyd resin composition is a medium-oil alkyd resin composition.

13. A coating comprising the composition of claim 6 wherein said alkyd resin composition is a short-oil alkyd resin composition.

* * * * *